Feb. 24, 1948. C. W. OTIS 2,436,597
METHOD AND MEANS FOR MOLDING PLASTIC OBJECTS
Filed Aug. 29, 1944 3 Sheets-Sheet 1
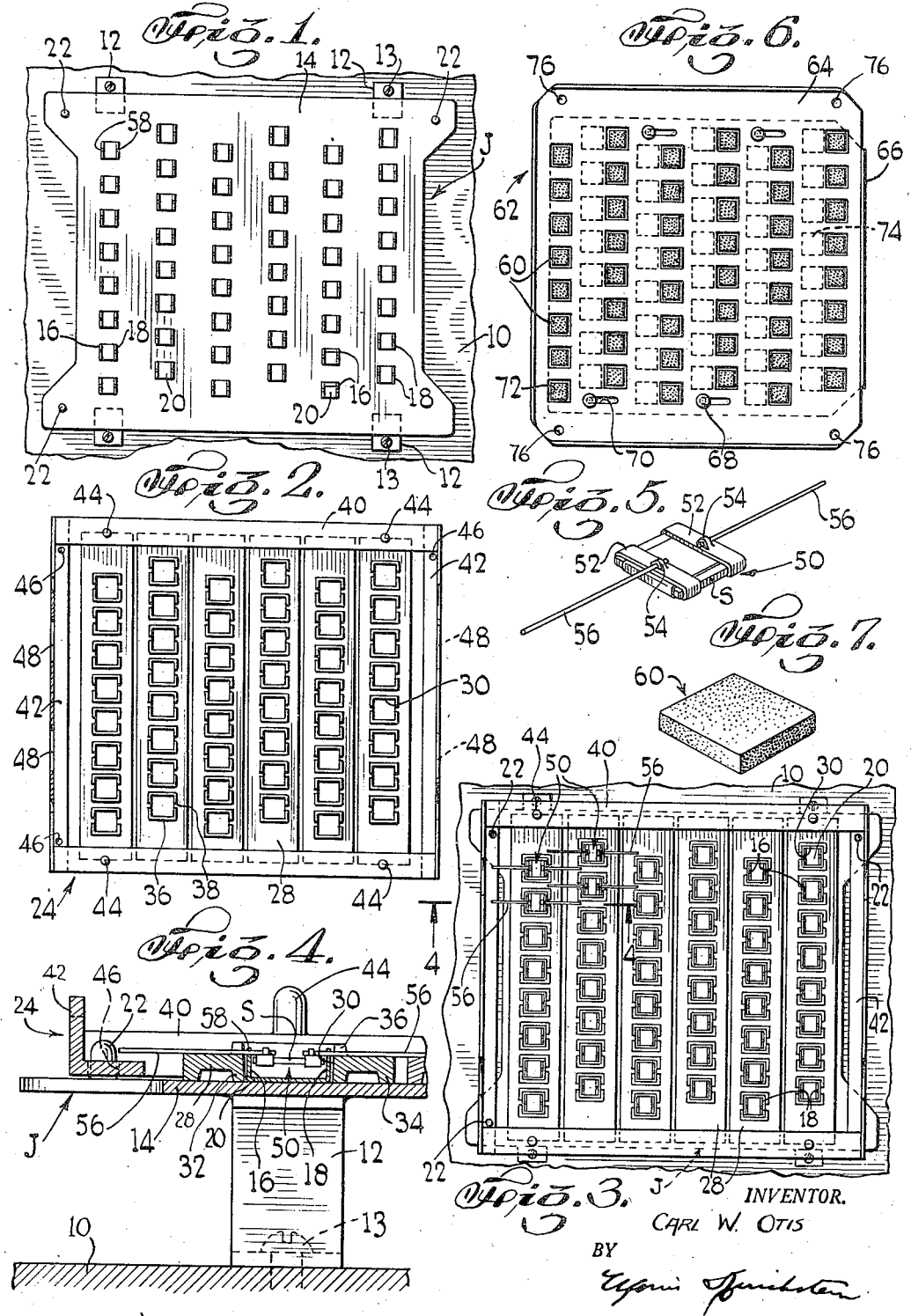
INVENTOR.
CARL W. OTIS
BY
ATTORNEY Feb. 24, 1948.  C. W. OTIS  2,436,597
METHOD AND MEANS FOR MOLDING PLASTIC OBJECTS
Filed Aug. 29, 1944  3 Sheets-Sheet 2
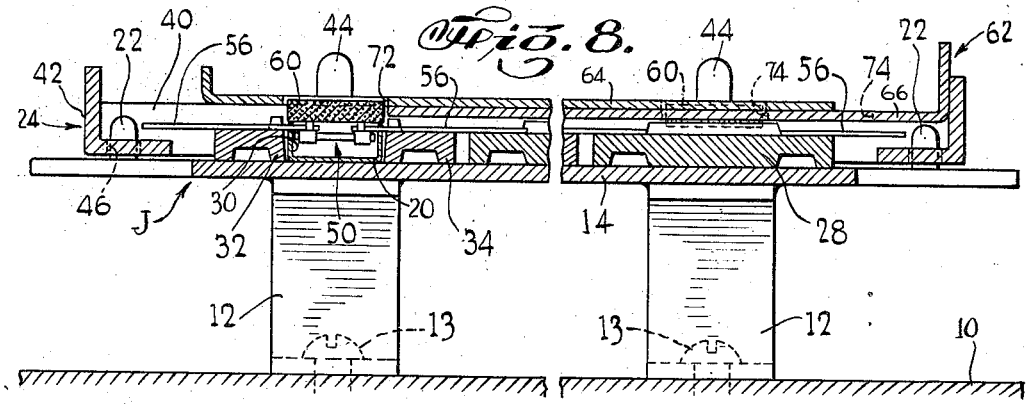
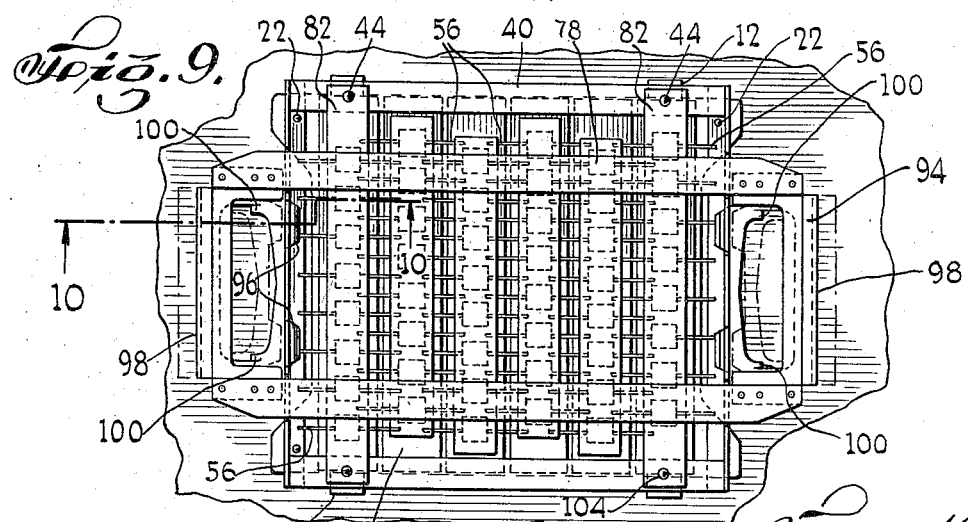
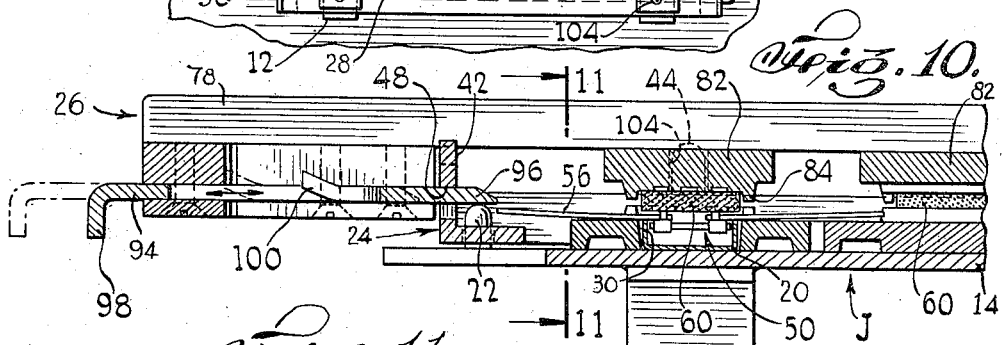
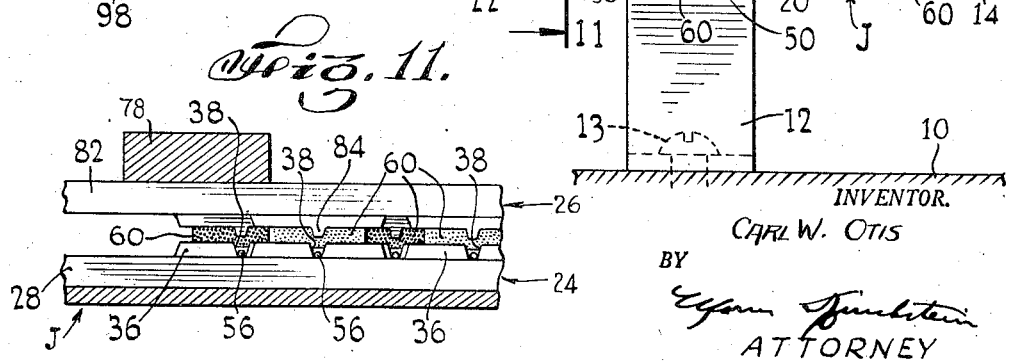
INVENTOR.
CARL W. OTIS
BY
ATTORNEY Feb. 24, 1948.                    C. W. OTIS                    2,436,597
                METHOD AND MEANS FOR MOLDING PLASTIC OBJECTS
                    Filed Aug. 29, 1944          3 Sheets-Sheet 3
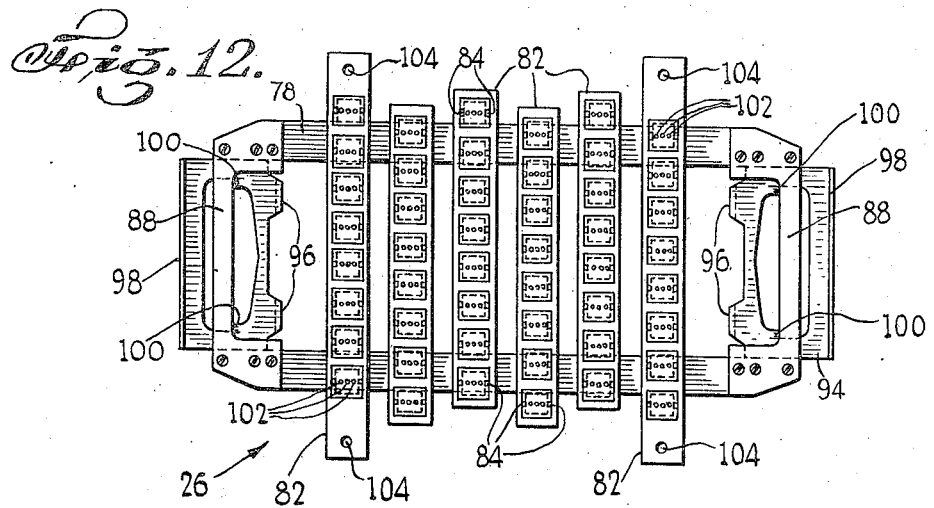
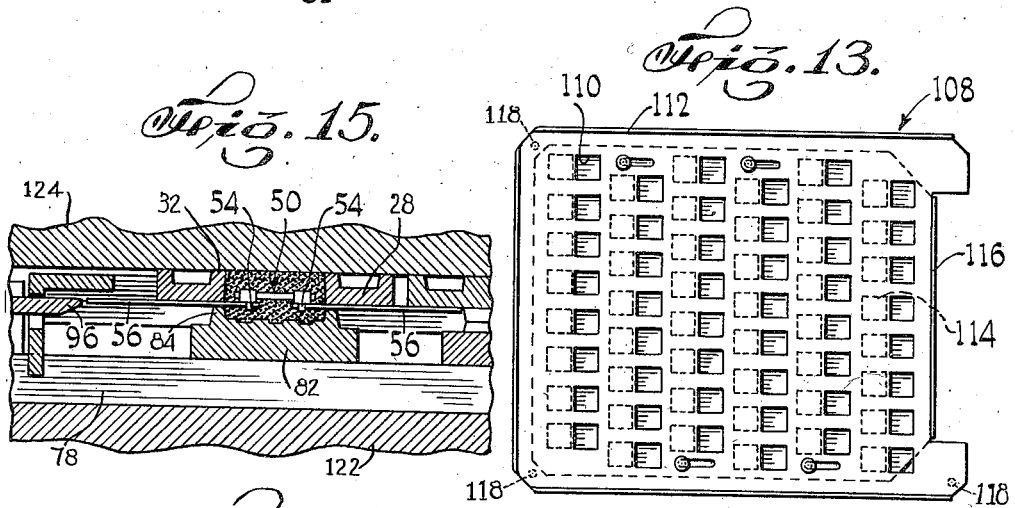
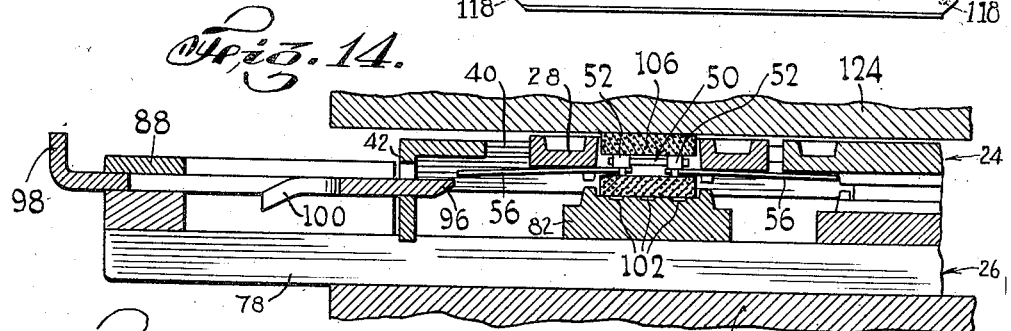
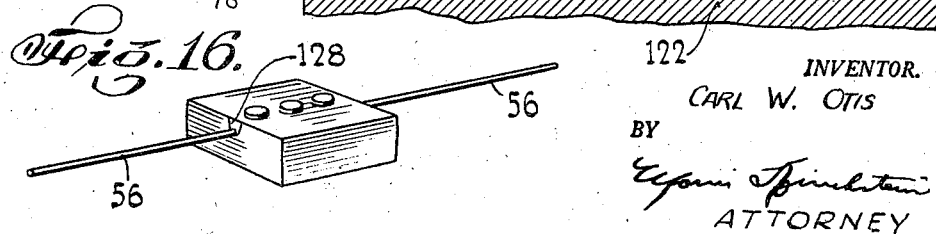
INVENTOR.
CARL W. OTIS
BY
ATTORNEY Patented Feb. 24, 1948

2,436,597

UNITED STATES PATENT OFFICE 2,436,597

METHOD AND MEANS FOR MOLDING PLASTIC OBJECTS

Carl W. Otis, Rockville Centre, N. Y., assignor to Noma Electric Corporation, New York, N. Y., a corporation of New York Application August 29, 1944, Serial No. 551,643

9 Claims. (Cl. 18—34)

1

This invention relates to a method and means for molding plastic objects.

The apparatus and method shown and described in the present application are specifically designed for the manufacture of a capacitor comprising a capacitor insert imbedded in a molded plastic block from which the two capacitor leads extend, but it is to be understood that this particular embodiment of the invention is given by way of example only and is not to be interpreted as limitative.

One of the objects of the invention is to provide a method and means of the character described, by which objects with inserts extending laterally therefrom can be molded with a high degree of perfection.

Another object of the invention is to provide a method and means of the character described, in which a highly simplified insert positioning device and molding die greatly increase the ease and speed at which the molded objects can be fabricated.

A further object of the invention is to provide an apparatus of the character described, in which the mold assembly is such that it can be manufactured by conventional machine tools, such as milling machines, contour saws, or drills, so as to avoid the customary practice of hobbing.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawings, in which is shown one form of my invention,

Fig. 1 is a top plan view of a jig for relatively positioning a plurality of capacitor inserts;

Fig. 2 is a top plan view of a cavity plate;

Fig. 3 is a top plan view of the cavity plate mounted on the jig and with some capacitor inserts in place;

Fig. 4 is an enlarged sectional view taken substantially along the line 4—4 of Fig. 3;

Fig. 5 is an enlarged perspective view of one of the capacitor inserts;

Fig. 6 is a top plan view of a loading rack for relatively positioning and depositing on one side of the cavity plate a plurality of pre-formed resin tablets, hereinafter referred to as "preforms";

Fig. 7 is an enlarged perspective view of a preform;

Fig. 8 is a sectional view similar to Fig. 4, but

2 showing the preform loading rack open and the preforms dropped in the cavity plate;

Fig. 9 is a top plan view similar to Fig. 3, but with a bottom plate assembly locked to the cavity plate, the dot and dash lines in said figure indicating the unlocked position of said assembly;

Fig. 10 is an enlarged sectional view taken substantially along the line 10—10 of Fig. 9;

Fig. 11 is a fragmentary sectional view taken substantially along the line 11—11 of Fig. 10;

Fig. 12 is a plan view of the face of the bottom plate assembly opposite to that shown in Fig. 9;

Fig. 13 is a top plan view of a loading rack for relatively positioning and depositing preforms on the other side of the cavity plate;

Fig. 14 is a sectional view through a molding press with the cavity plate and bottom plate assembly, together with capacitor inserts and preforms, disposed in proper position for molding;

Fig. 15 is a view similar to Fig. 14 after the molding operation has taken place; and Fig. 16 is an enlarged perspective view of the molded capacitor, consisting of a capacitor insert imbedded in a plastic block.

Heretofore it has been the practice to make capacitors which consisted of capacitor inserts imbedded in a block of plastic with an apparatus in general similar to that disclosed in United States Letters Patent No. 1,973,117 to Herman L. Sklar. Such apparatus consisted of upper and lower molding dies, in each of which the mold cavities had been hobbed.

The apparatus also included a supporting and positioning frame which held the inserts in proper predetermined position within the molding cavities. In using this apparatus, the upper mold plate had preforms placed in its cavities; the inserts were placed and locked in their frame; the insert frame placed over the upper mold plate with its preforms and attached thereto; another set of preforms placed in the lower mold plate; the upper mold plate and attached frame inverted and placed over the lower mold plate with its mold cavities in registry with those in the lower plate; and then both plates, locked together and with the insert positioning frame sandwiched therebetween, placed in a molding press.

This apparatus and process had several difficulties. For one thing, it required the use of hobbed mold cavities.

Hobbing, as is well known, is difficult and expensive to carry out, since it requires the use of special hobbing dies, extremely heavy hobbing presses, and successive re-annealings of the dies being hobbed. Such operations are customarily carried out by firms specializing in hobbing, who employ workers particularly skilled in said process.

Another difficulty with the former practice was that the die apparatus was heavy, including two die plates and an insert holding frame, all of which had to be lifted up by an operator and inserted in a molding press.

Consequently, the number of capacitors molded at each operation was quite limited.

Another difficulty with said practice was that it required many operations to prepare the inserts and preforms for molding, thus further reducing the output of each molding unit.

Another trouble with said practice was the difficulty in obtaining proper disposition of the inserts in the mold cavities, due principally to the fact that the inserts were positioned in a frame while away from the die plates.

In general, I overcome these and other difficulties by making one of the die plates, preferably the lower one, in two pieces called, for convenience the cavity plate and the bottom plate. The cavity plate contains a number of through holes, one open end of each of which is closed off or capped by the bottom plate. The other open end may be capped by the platen of a molding press. This eliminates the upper die plate and thus greatly reduces the weight of the molding dies. The inserts are placed on the cavity plate and the bottom plate subsequently superimposed and locked to the cavity plate, thereby clamping the inserts in position. This eliminates the necessity of employing an insert holding frame. The inserts are properly positioned in the molding cavities by a locating device called, for convenience, a jig. Said jig has positioning means which extend into the open ends of the holes in the cavity plate opposite to that capped by the bottom plate. Because of this construction, after the bottom plate has been locked on the cavity plate, the two plates can be lifted as a unit away from the jig. Additional positioning means may be associated with the cavity or bottom plate to aid in initially locating and subsequently maintaining the inserts in their proper places.

Referring now in detail to the drawings, in Fig. 1 I have shown the jig J which is used to position the capacitor inserts in predetermined relative relationship and in proper position in the mold cavities. Said jig, which is detachably mounted on a table 10 by means of supporting standards 12 and screws 13, comprises a large flat plate 14, to which there are secured a plurality of pairs of positioning fingers 16, 18. These fingers may be held on the plate in any suitable manner and in the instant case I have shown them as comprising the opposite flanges of short U-shaped channel sections 20, whose bases are welded to the plate 14. The relative position of the several pairs of fingers are governed by considerations which will appear in the following portions of the description, and in general said position conforms to the relative positioning which the several capacitors are desired to occupy after molding. The plate 14 also carries a plurality of, in this case three, upstanding locating pins 22, whose function it is to insure proper registration between the capacitor insert jig and a cavity plate 24.

The molding die is in two parts, comprising the cavity plate 24 (Fig. 2), and a bottom plate assembly 26 (Fig. 12).

The cavity plate 24 includes several elongated bars 28, each having a plurality of through holes 30 therein. For convenience, these holes are linearly arranged, although it will be apparent as the description proceeds, that the same is not essential. Said holes have a contour which negatively matches the plan contour of the plastic block in which the capacitor insert is to be imbedded, and in this instance such contour is rectangular, although any suitable contour might be used. The sides of the holes may have a slight draft (exaggeratedly shown in Fig. 4) to facilitate the removal of the plastic blocks after molding.

It will be appreciated that these holes may be formed in the bars in various manners, involving conventional machine shop practice, exclusive of hobbing. Thus, the holes can easily be cut out by contour sawing, drilling and shaping, or milling.

The bottom surface of the bars 28 (as viewed in Figs. 2 and 4) is so fashioned as to provide a flash lip 32 of uniform height all around the edge of each hole 30. In addition, flanges 34 of the same height extend down the length of the bottom face of each bar. On the top surfaces of the bars the holes are likewise provided with flash lips 36, which have aligned tapering grooves 38 cut into opposite lateral sides thereof, as clearly shown in Figs. 2 and 11. The bottoms of said grooves preferably lie approximately flush with the top surfaces of the bars. The several bars are arranged in closely spaced, parallel relationship, as illustrated in Fig. 2, the ends thereof being secured to opposite bars 40 which form the sides of a frame whose ends are right angled channel irons 42. The ends of the cavity bars 28 which are secured to the sidebars 40 are notched to permit the bottom surfaces of said cavity (as viewed in Figure 4) to project beneath the bottom surface of the frame members 40, 42. Each sidebar 40 is provided with two upstanding pins 44, which are used to register the cavity plate 24 and bottom plate assembly 26. The angle irons 42 have three holes 46 drilled therein to register the cavity plate with the locating pins 22. The upstanding flanges of the channel irons 42 each have two slots 43 provided therein to cooperate with a locking means, later described, for clamping together the cavity plate 24 and bottom plate assembly 26.

The cavity bars 28 are made of steel in order to obtain the hardness, dimensional stability, tensile and compressive strength and toughness essential for a molding die. However, I have greatly lightened the cavity plate 24 by employing a plurality of narrow spaced steel cavity bars instead of a single wide steel plate and by making the side frame bars 40, which are not subjected to the same wear and stresses as the cavity bars 28, of duraluminum. Such use of two metals having different coefficients of thermal expansion does not distort the cavity plate in operation since all structural elements subjected to heat and running lengthwise of the plate are made of duraluminum and like elements extending across the plate are made of steel.

The capacitor inserts 50 (Fig. 5), which are used in conjunction with the illustrated apparatus, are of conventional construction, generally comprising a stack S of interleaved sheets of electrically conductive and electrically non-conductive material, such as metal foil and thin mica plates. The sheets of the stack are held together by clamping strips 52, each of which has secured thereto, as by ears 54, a length of lead wire 56 which is the lateral extension herein. For reference purposes, the length of all parts will be considered to be parallel to the wires and the width transverse thereto.

The length of the stack S controls the spacing between the pairs of fingers 16, 18. Because of this, I employ a plurality of capacitor insert jigs, at least one for each size of insert having a different length of stack. I prefer to have the fingers spaced apart a distance such that they will snugly accommodate stacks of maximum tolerance.

I also provide a cavity plate 24 for each size of capacitor to be manufactured and the length of the holes 30 in each plate is slightly in excess of the space between the outer surfaces of the corresponding fingers 16, 18.

The width of the fingers may be varied considerably, although they are shown herein as being approximately the same width as the stacks. The width of the holes 30 is greater than that of the stacks, this difference in width being controlled by the amount it is desired to have plastic material extend beyond the edge of the stack. It may also be noted that the length of the holes may be greater than indicated, if it is desired to have more plastic material beyond the ends of the stack. However, it is usually sufficient to provide holes which are longer than the stack by the amount already indicated.

Proper registration between the pairs of fingers 16, 18 and the holes 30 is insured by the locating fingers 22 and apertures 46.

The first step in the practice of my invention consists in placing the cavity plate 24 on top of the capacitor insert jig J, the upstanding pins 22 being inserted in the locating holes 46 to register the fingers 16, 18 in the holes 30 (see Fig. 4). The capacitor inserts 50 are then laid on the cavity plate 24 in the manner indicated in Figs. 3 and 4 with the stacks disposed between the fingers 16, 18 and the lead wires 56 in the grooves 38. Said fingers will locate the capacitor inserts longitudinally and the grooves 38 center said inserts transversely in the holes 30. The lead wires, due to the depth of the grooves 38, will lie flat on top surfaces of the bars 28. The stack is suspended beneath the lead wires.

It will be noted that the fingers 16, 18 are quite high and their top edges extend to the tops of the lead wires positioned in the cavity plate. Accordingly, said fingers are provided with registered notches 58 (Fig. 1) to accommodate said lead wires and to further aid in locating the capacitor inserts in the holes 30. These notches are, obviously, in registration with the grooves 38.

It will also be noted that the rows of holes 30 are staggered so that the lead wires 56 in consecutive rows will not interfere with each other. The bars are spaced close enough together for the lead wires of one row to extend approximately up to the stacks of the capacitor inserts in the next row (see Fig. 3).

The next step is to place a preform tablet on top of each of the capacitor inserts while the same are fixed in position in the holes 30 of the cavity plate.

Preferably, the lower portions of the preforms are within the holes and the upper portions protrude therefrom.

Said preforms, as is well known to the art, comprise tablets 60 of a non-cured or partially cured thermosetting or thermoplastic resin which is shaped to roughly the dimensions of the space which it is eventually to occupy. The preforms are ordinarily higher than required, but of a slightly smaller overall plan contour so that they may be fitted readily into the mold cavities. The tablets may have upper and lower surface configurations roughly conforming to the configuration they will assume upon molding. In the instant case, however, such refined form of tablet is not employed, the upper and lower surfaces of the preforms 60 (Fig. 7) being plane, although it is to be understood that the invention is in nowise limited to the disclosed shape. The preforms, as indicated above are, in accordance with my invention, disposed on top of the capacitor inserts 50 when the latter are in the position indicated in Figs. 3 and 4.

Said preforms may be so placed manually. However, to simplify their placement, I have provided a loading rack 62 (Fig. 6). In essence, said rack comprises means to relatively position a plurality of preforms in a pattern corresponding to that of the several holes 30; means to locate said rack in predetermined relationship relative to the cavity plate when superimposed thereon, and means to subsequently release all of the preforms upon the capacitor inserts, preferably without horizontal movement of the preforms.

More specifically, said rack 62 includes an upper plate 64 and lower plate 66. Said plates are held together by a plurality of studs 68 secured to the lower plate and having their shanks extending through slots 70 in the upper plate. The studs are headed to prevent the plates from separating. This construction allows the plates 64, 66 to be relatively shifted in the direction of the slots 70 for a distance determined by the length of said slots and the diameters of the stud shanks.

The upper plate 64 has a plurality of apertures 72 cut therethrough. These apertures are arranged in a pattern exactly the same as that of the holes 30. Said apertures are slightly larger than the preforms 60, but no larger than the holes 30. When the two plates 64, 66 are in the relative position indicated in Fig. 6, the lower plate blocks off the bottom of the apertures 72 and thus permits a plurality of preforms 60 to be placed, manually for example, in said apertures. When it is desired to release these preforms and deposit the same in the holes 30 on top of the condenser inserts 50, the lower plate 66 is shifted to the right (as viewed in Fig. 6). This action lines up with the apertures 72 a plurality of similarly arranged apertures 74 in said lower plate which are of the same size as or slightly larger than said apertures 72.

Construction of the plate 66 is simplified by omitting a row of apertures 74 corresponding to the extreme left-hand row of apertures 72 in the plate 64 and, instead, having the left-hand edge of the lower plate 66 disposed slightly to the left of said left-hand row of apertures 72 when the plates 64, 66 are in the position shown in Fig. 6, that is, ready to receive and hold preforms. In this manner, when the plate 66 is shifted to the right, the left-hand edge thereof will clear the mentioned row of apertures 72, permitting preforms disposed therein to drop through the device 62.

It will be noted that the upper plate 64 is considerably wider than the lower plate 66. In the overhanging portions of the upper plate 64 thus provided, a plurality of locating holes 76 are drilled. These holes are relatively disposed in the same manner as the locating pins 44 on the side bars 40 of the cavity plate 24 and are so placed as to obtain registry of corresponding apertures 72 and holes 30.

To use the loading rack 62, first the plate 66 is shifted to close off the bottoms of the apertures 72; then preforms are inserted in said apertures. Next the device 62 is placed on top of the cavity plate 24 with the pins 44 inserted through the holes 76. Finally, the plate 66 is shifted to the right registering the apertures 72 and 74, and allowing the preforms 60 to drop therethrough and deposit on top of the capacitor inserts 50 lying in the apertures 30. At this moment the relative position of the various parts described is shown in Fig. 8. After the preforms are deposited in the foregoing manner, the rack 62 is lifted clear of the cavity plate 24.

Attention is directed to the fact that the upper plate 64 is held stationary during loading of the preforms so that the preforms are not shifted horizontally. I have found that this gives much more satisfactory results in depositing the preforms in the holes 30 than when the lower plate 66 is held stationary and the upper plate shifted.

The next piece of apparatus employed is the bottom plate assembly 26. Said assembly includes a frame which comprises two longitudinal Duralumin bars 78 on which a plurality of elongated steel cross bars 82 are supported in the same relative position as the bars 28 of the cavity plate 24. Each cross bar 82 has a plurality of pairs of nibs 84 arranged in a pattern corresponding to the pattern of the pairs of grooves 38 on the flash lips 36 of the cavity plate. These nibs are of such configuration that they can fit snugly into said grooves leaving a space between the tip of each nib and bottom of each groove to accommodate a lead wire 56. The dotted squares superimposed upon the bars 82 indicate the positions of the cavities 30 when the cavity plate is mounted on the bottom plate assembly.

The bottom plate assembly is also provided with suitable carrying means which may be in the form of a pair of handles 88 mounted on opposite ends of the longitudinal bars 78.

Further pursuant to the invention, means are provided in conjunction with the bottom plate assembly 26 to permit locking thereof under pressure to the cavity plate 24. Said locking means, which is duplicated on each of the handles 88, comprises a plate 94 captively disposed in the handle 88 in such manner as to slide lengthwise of the bottom plate assembly 26. The plate 94 has two beveled tongues 96 (Fig. 10) which are designed, upon retraction of the plate 94 into the handle, to enter the slots 48 in the upstanding flanges of the angle irons 42 of the cavity plate 24. The beveled surface of the tongues 96 face away from the bars 28 when the bottom plate assembly 26 and cavity plate 24 are in the assembled relationship soon to be described. Flanges 98 may be formed on the outer ends of the plates 94 to facilitate manipulation thereof and tines 100 are struck from the plate to limit the outward movement thereof.

Any desired surface configuration may be given to the portions of the surfaces of the bars 82 which will be in registration with the through holes 30 in the cavity plate 24. For example, three indentations 102 may be formed on the mentioned portions of said bars 82 in order to impart a characteristic configuration to the corresponding surface of the capacitors. It will be noted that the bottom plate assembly is lightened in the same manner as the cavity plate without creating distortion thereof in use and that the expansion of these two parts under heat matches, so that registry is maintained.

The bottom plate assembly 26 is used in the following manner:

Said assembly is manipulated so that the surface of the bars 82 having the indentations 102 face downwardly and in this position the assembly is superimposed on the cavity plate 24 while the same is still on top of the capacitor insert jig J and while the capacitor inserts and preforms are located in the holes 30. Registration between the bars 82 and 28 is secured by inserting the locating pins 44 in coadjuting apertures 104 in the bottom plate assembly. Now the locking plates 94 are moved towards each other so as to thrust the tongues 96 through the slots 48 and detachably secure the bottom plate assembly to the cavity plate. The bars 28, 82 occupy such relative positions at this time that they will clamp capacitor inserts 50 therebetween with the preforms caught between the inserts and bars 82, as shown in Fig. 10. As a matter of fact, the pressure exerted upon the inserts and preforms when the bottom plate assembly is locked to the cavity plate may be such that the capacitor inserts are forced downwardly to a slight extent bowing the lead wires upwardly, as also shown in Fig. 10. This pressure is gradually applied as the beveled surface of the tongues 96 ride on the upper edges of the slots 48.

The cavity plate 24 and bottom assembly plate 26 are then lifted together as a unit from the capacitor insert jig, and the unit is turned upside-down to dispose uppermost what were heretofore the open bottom ends of the holes 30.

At this time, the now upper ends of said holes are unfilled and the next step is to place in such open ends another set of preforms 106 of substantially the same shape as the preforms 60. As with the preforms 60, the preforms 106 can be deposited in said other open ends of the holes 30 manually or mechanically. I prefer to accomplish the same mechanically and to this end provide a second loading rack 108. This rack is generally similar to the loading rack 62 shown in Fig. 6 and already described. It differs therefrom basically only in the pattern of the apertures 110 in the upper plate 112 and apertures 114 in the lower plate 116, said pattern corresponding to the reversed pattern of the holes 30 after the cavity plate has been inverted. The rack 108 is used in the same manner as the rack 62 to mutually arrange a plurality of preforms 106 in a pattern corresponding to the pattern of the holes 30.

To employ said rack 108, I place a preform 106 in each of the apertures 110 while the bottoms of said apertures are blocked off by the lower plate 116. Now the rack 108 is superimposed on the top of the cavity plate 24 (the bottom of said plate as viewed in Fig. 10 but now the top because of inversion of the unit). For purposes of registration, said device 108 carries depending pins 118 which are adapted to be received in the locating apertures 46 in the cavity plate 24. It will be apparent that when the rack 108 is in position and the bottom plate 116 is shifted, the apertures 110, 114 will be aligned and the preforms 106 dropped therethrough into proper position on top of the capacitor inserts 50 in the holes 30. The rack 108 like the rack 62 does not shift the preforms horizontally during loading.

The molding die is now ready to be inserted in a molding press. To effect this operation, I lift the unitarily locked cavity plate 24 and bottom plate assembly 26 by the handles 88 and rest the bars 78 on the lower heated platen 122 of a molding press having an upper heated platen 124 movable towards and away from said lower platen. The platens are set into motion to approach each other. The pressure and heat thus applied plasticize the preforms 60, 106, causing the same to flow into and fill up the mold cavities defined by the upper platen 122, bars 82 and holes 30. Any excess material will flow over the flash lips 32, 36 and between the nibs 84 and grooves 38. Since pressure, and particularly heat, are applied to the preforms before the mold is fully closed and since excess material is forced out of the cavities, the operation taking place is classified as "flash" molding. It will be appreciated, however, that other types of molding, for example compression or powder molding, may also be carried out in accordance with the foregoing process and with the use of the apparatus described.

The platens are left in molding position for a period of time sufficient to set the thermosetting resin customarily used in making capacitors of the type described. The platens are then opened, the molding die abstracted, the bottom plate assembly unlocked and taken away from the cavity plate, and the molded capacitors stripped from said cavity plate. These capacitors have the appearance shown in Fig. 16. One set of parting lines is visible on each lateral edge. This is the set of inclined lines 128 formed at the juncture between the nibs 84 and grooves 38. The parting lines at the open ends of the through holes 30 will not be noticed, since they are at the edges of the condenser.

It will be seen that said apparatus and process represent a marked improvement over that heretofore employed in the molding of plastic articles with laterally extending inserts. For example, the device which is used to position the inserts is not carried along with the molding dies when the latter are inserted in a molding press, the inserts being held in place at the time of molding by the two parts of the holding die itself.

It will also be noticed that the insert positioning means herein described and the method of using the same will result in a highly accurate registration of the inserts in the molding cavity, thus obviating the formation of molded pieces in which the edges of inserts lie too close to the external surface of the molded block.

It will further be appreciated that the molding die prepared in accordance with my invention is extremely easy to manufacture, since the molding cavity is a through hole in a metal piece having at least one of its open ends capped by another metal piece, both of these pieces being susceptible of preparation without the time and expense of the drawn-out hobbing process. In the actual apparatus shown, the other end of the through hole is capped by a platen of the press itself, provided that the corresponding surface of the molded piece is flat. This does away with the use of the upper heavy mold die, and appreciably lightens the weight of the mold die apparatus, which must be picked up by an operator and inserted in a molding press.

It will thus be seen that I have provided a method and apparatus for molding plastic articles which achieves the several objects of my invention and which is well adapted to meet the conditions of practical use.

As various possible embodiments might be made of the above invention and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. A process for molding a plastic object having an insert with lateral extensions projecting from opposite sides of the object comprising disposing the bottom surface of a cavity plate having a through hole on a jig having insert positioning means, with the hole in registration with said positioning means, placing an insert on the opposite surface of the cavity plate, with the aid of said positioning means locating the insert with respect to the hole so that the insert bridges the hole, placing a preform upon the portion of the insert between the edges of the hole, placing a plate assembly on top of the cavity plate so as to press against the preform and thereby force the lateral extensions of the insert against the surface of the cavity plate, locking the plate assembly to the cavity plate, inverting the locked plate assembly and cavity plate to expose the other end of the through hole, placing a preform in said other end, placing said inverted locked plate assembly, cavity plate, preforms and insert on the platen of a molding press, moving the two platens of said press together, heating said preforms so as to cause the same to flow and fill the hole, moving said platens apart, unlocking and removing said plate assembly from said cavity plate, and stripping the plastic object with the laterally extending insert from the cavity plate.

2. In a process of molding plastic objects having laterally extending inserts, that improvement which comprises the steps of disposing a cavity plate having a through hole on a jig having insert positioning means with said positioning means extending into said hole through one open end thereof, disposing an insert on the cavity plate at the opposite end of said hole with a portion of the insert within said hole, locating said insert in said hole with the aid of said positioning means, clamping said insert against said cavity plate in its located position, removing said positioning means from said hole, closing both ends of said hole, and molding plastic material around said insert in said hole.

3. In a process of molding plastic objects having laterally extending inserts, that improvement which comprises the steps of disposing a cavity plate having a through hole on a jig having insert positioning means with said positioning means extending into said hole through one open end thereof, disposing an insert on the cavity plate at the opposite open end of said hole with a portion of the insert within said hole, locating said insert in said hole with the aid of said positioning means, placing a plasticizable preform on top of said insert, clamping said preform and insert against said cavity plate with said insert in its located position, removing said positioning means from said hole, closing both ends of said hole, and plasticizing said preform whereby to mold plastic material around the insert in said hole.

4. In a process of molding plastic objects having laterally extending inserts, that improvement which comprises the steps of disposing an insert on top of a cavity plate having a through hole with a portion of the insert in registry with said hole, placing a preform on top of the insert, placing a second plate on top of the cavity plate so as to clamp the insert and preform to the cavity plate, detachably securing the second plate to the cavity plate to form a molding unit, inverting the unit, placing a preform in the hole on the other side of the cavity plate, placing the inverted unit with preforms and insert on a platen of a molding press, and moving the platens of said press together so that the other platen of the press forms a surface of the molding cavity.

5. In a process of molding plastic objects having laterally extending inserts, that improvement comprising the steps of disposing an insert over one open end of a through hole in a cavity plate with a central portion only of the insert registered with said hole and the sides of the insert extending over both sides of the hole, placing a preform on top of said insert, placing a plate on said cavity plate over said open end so as to clamp the insert and preform to the cavity plate, placing a preform in the other open end of said hole, closing the other end of said hole, and plasticizing said preform whereby to mold plastic material around the insert in said hole.

6. An apparatus as set forth in claim 7 wherein the positioning means comprises a pair of spaced fingers.

7. An apparatus for molding a plastic object having an insert with lateral extensions projecting from opposite sides of the object, said apparatus comprising a cavity plate having a through hole, a jig having insert positioning means adapted to project into the hole from one side of the plate so as to locate the insert in the hole when the insert is disposed on the opposite side of the plate and bridges the hole, means located on said other side of the plate to hold the insert in such position whereby the positioning means may be withdrawn without disturbing the holding means, and cooperating locating means associated with said plate and jig to dispose said positioning means in predetermined position within said hole when the plate and jig are juxtaposed.

8. An apparatus for molding a plurality of plastic objects, said apparatus comprising a hollow polygonal frame, a plurality of elongated cavity bars, each having a plurality of through mold cavities therein of the shape of the object to be molded, said bars being disposed in parallel spaced relationship and each bar having the ends thereof located at opposed sides of the frame, interconnecting means to rigidly secure said ends of the bar on said sides of the frame, and means to cap all of the cavities so as to close the same for molding, said capping means including another hollow polygonal frame, a plurality of elongated capping bars having their ends located at opposed sides of the second frame, and interconnecting means to rigidly secure said ends of the bar on said sides of the second frame, said capping bars being disposed in a relative relationship matching that of the cavity bars.

9. An apparatus for molding a plurality of plastic objects, said apparatus comprising a hollow polygonal frame, a plurality of elongated cavity bars, each having a plurality of through mold cavities therein of the shape of the object to be molded, said bars being disposed in parallel spaced relationship and each bar having the ends thereof located at opposed sides of the frame, interconnecting means to rigidly secure said ends of the bar on said sides of the frame, and means to cap all of the cavities so as to close the same for molding, said capping means including another hollow polygonal frame, a plurality of elongated capping bars having their ends located at opposed sides of the second frame, and interconnecting means to rigidly secure said ends of the bar on said sides of the second frame, said capping bars being disposed in a relative relationship matching that of the cavity bars, the sides of both said frames to which the bars are secured comprising a light metal structural element.

CARL W. OTIS.

REFERENCES CITED

The following references are of record in the file of this patent:

UNITED STATES PATENTS

| Number | Name | Date |
| --- | --- | --- |
| 587,117 | Eastabrook | July 27, 1897 |
| 607,152 | Wiman | July 12, 1898 |
| 767,872 | Davies | Aug. 16, 1904 |
| 837,757 | Treleaven | Dec. 4, 1906 |
| 1,209,358 | Terkelsen | Dec. 19, 1916 |
| 1,284,553 | Apple | Nov. 12, 1918 |
| 1,494,723 | Tucker et al. | May 20, 1924 |
| 1,547,399 | Kaufmann et al. | July 28, 1925 |
| 1,681,713 | Thurlow | Aug. 21, 1928 |
| 1,913,473 | Bremecke | June 13, 1933 |
| 1,972,411 | Swartz et al. | Sept. 4, 1934 |
| 1,973,117 | Sklar | Sept. 11, 1934 |
| 2,064,971 | Edison, Jr. | Dec. 22, 1936 |
| 2,153,087 | Knapp | Apr. 4, 1939 |
| 2,166,205 | Anderson et al. | July 18, 1939 |
| 2,176,604 | Benkelman | Oct. 17, 1939 |
| 2,193,242 | Smith | Mar. 12, 1940 |
| 2,200,634 | O'Koomian | May 14, 1940 |
| 2,256,769 | Amrine | Sept. 23, 1941 |
| 2,293,789 | Abbott | Aug. 25, 1942 |
| 2,351,713 | Sayre | June 20, 1944 |